United States Patent
Bohling et al.

(10) Patent No.: US 9,029,465 B2
(45) Date of Patent: May 12, 2015

(54) PREPARATION OF MULTISTAGE LATEX POLYMER

(75) Inventors: James C. Bohling, Lansdale, PA (US); Arnold S. Brownell, Lansdale, PA (US); Catherine A. Finegan, Warrington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/234,546

(22) PCT Filed: Jul. 25, 2012

(86) PCT No.: PCT/US2012/048095
§ 371 (c)(1),
(2), (4) Date: May 6, 2014

(87) PCT Pub. No.: WO2013/016402
PCT Pub. Date: Jan. 31, 2013

(65) Prior Publication Data
US 2014/0163160 A1    Jun. 12, 2014

Related U.S. Application Data

(60) Provisional application No. 61/511,674, filed on Jul. 26, 2011.

(51) Int. Cl.
| | | |
|---|---|---|
| C08F 275/00 | (2006.01) | |
| C09D 151/00 | (2006.01) | |
| C08F 2/00 | (2006.01) | |
| C08F 2/22 | (2006.01) | |
| C08F 265/04 | (2006.01) | |
| C08F 265/06 | (2006.01) | |

(52) U.S. Cl.
CPC ............... *C08F 275/00* (2013.01); *C08F 2/001* (2013.01); *C08F 2/22* (2013.01); *C08F 265/04* (2013.01); *C08F 265/06* (2013.01); *C09D 151/003* (2013.01)

(58) Field of Classification Search
CPC .................................................. C08F 275/00
USPC ......................................................... 525/287
See application file for complete search history.

(56) References Cited

U.S. PATENT DOCUMENTS

| | | | |
|---|---|---|---|
| 6,080,802 A | 6/2000 | Emmons et al. | |
| 6,576,051 B2 | 6/2003 | Bardman et al. | |
| 7,179,531 B2 | 2/2007 | Brown et al. | |
| 7,285,590 B2 * | 10/2007 | Holub et al. | 524/460 |
| 7,705,082 B2 | 4/2010 | Porzio et al. | |
| 2003/0018103 A1 | 1/2003 | Bardman et al. | |

FOREIGN PATENT DOCUMENTS

EP    1496091 A1    1/2005

* cited by examiner

*Primary Examiner* — Vu A Nguyen
(74) *Attorney, Agent, or Firm* — Reid S. Willis

(57) ABSTRACT

The present invention relates to a process for preparing a multistage phosphorus acid functionalized latex polymer comprising the steps of: a) contacting a first acrylic monomer with a first phosphorus acid monomer under emulsion polymerization conditions to form a first stage polymer; then b) contacting the first stage polymer with a second acrylic monomer and a second phosphorus acid monomer under emulsion polymerization conditions to form the latex polymer. The latex polymer is useful as an absorbing polymer for pigment particles used, for example, in coatings formulations.

8 Claims, No Drawings

PREPARATION OF MULTISTAGE LATEX POLYMER

The application claims priority to U.S. Application No. 61/511,674, filed Jul. 26, 2011.

BACKGROUND OF THE INVENTION

Latex coating compositions include a variety of additives to improve performance. For example, anti-freeze additives such as ethylene glycol and propylene glycol are used to prevent the composition from freezing and to improve composition performance at low temperatures. Coalescing solvents are also used to lower minimum film-forming temperature. Nevertheless, the use of these additives have become less desirable due to regulatory pressures toward reducing or even eliminating volatile organic compounds (VOCs) in formulations. In one approach for addressing this problem, U.S. Pat. No. 7,705,082 discloses the addition of a low volatile oligomeric ethylene glycol derivative to produce a coating formulation with acceptable freeze-thaw properties. However, the disclosed method requires substantial amounts of the additive, adding cost and complexity, as well as potentially increased water sensitivity and foaming, to the formulation. It would therefore be desirable to find other methods to achieve acceptable freeze-thaw properties without the use of VOCs.

SUMMARY OF THE INVENTION

The present invention provides a process comprising the steps of:
a) contacting under emulsion polymerization conditions a first portion of an acrylic monomer with a first portion of a phosphorus acid monomer to form a first stage polymer; and
b) contacting the first stage polymer with a second portion of an acrylic monomer and a second portion of a phosphorus acid monomer under emulsion polymerization conditions to form a latex polymer;
wherein the amount of the first portion of the phosphorus acid monomer is from 2 to 8 weight percent of the weight of the first stage polymer; the weight of the second portion of the phosphorus acid monomer is from 15 to 40 weight percent of the weight of the first portion of acid monomer; the first portion of the acrylic monomer is from 5 to 50 weight percent of the first and second portions of acrylic monomer; with the proviso that the monomers are selected so that the $T_g$ of the latex polymer is in the range of −20 to 50° C.

The present invention addresses a need in the art by providing low or zero VOC paint formulations with desirable freeze-thaw properties.

DETAILED DESCRIPTION OF THE INVENTION

The present invention provides a process comprising the steps of:
a) contacting under emulsion polymerization conditions a first portion of an acrylic monomer with a first portion of a phosphorus acid monomer to form a first stage polymer; and
b) contacting the first stage polymer with a second portion of an acrylic monomer and a second portion of a phosphorus acid monomer under emulsion polymerization conditions to form a latex polymer;
wherein the amount of the first portion of the phosphorus acid monomer is from 2 to 8 weight percent of the weight of the first stage polymer; the weight of the second portion of the phosphorus acid monomer is from 15 to 40 weight percent of the weight of the first portion of acid monomer; the first portion of the acrylic monomer is from 5 to 50 weight percent of the first and second portions of acrylic monomer; with the proviso that the monomers are selected so that the $T_g$ of the latex polymer is in the range of −20 to 50° C.

A first portion of a phosphorus acid or acrylic monomer refers to one or more of the specified monomers used in step a) to make a first stage polymer; similarly, a second portion of a phosphorus acid or acrylic monomer refers to one or more of the specified monomers used in step b) (a second stage of polymerization). The acrylic and phosphorus acid monomers used in the first stage may be the same as or different from the acrylic and phosphorus acid monomers used to make the final latex polymer.

Examples of suitable acrylic monomers include acrylates and methacrylates such as methyl methacrylate, ethyl methacrylate, ethyl acrylate, butyl acrylate, butyl methacrylate, and ethyl hexyl acrylate and combinations thereof. Preferred combinations of acrylic monomers include methyl methacrylate and one or more monomers selected from the group consisting of ethyl acrylate, butyl acrylate, and 2-ethylhexyl acrylate. More preferred combinations of acrylic monomers include methyl methacrylate and butyl acrylate; methyl methacrylate and ethylhexyl acrylate; and methyl methacrylate, butyl acrylate, and ethyl acrylate.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

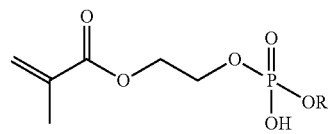

where R is H or

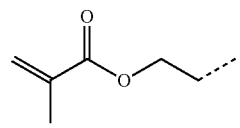

Either or both of the first and second stage polymerization steps may include contacting additional monomers under polymerization conditions. Examples of suitable additional monomers include carboxylic acid functional monomers such as acrylic acid, methacrylic acid, and itaconic acid;

sulfur acid functional monomers, including sulfoethyl(meth) acrylate, sulfopropyl(meth)acrylate, styrene sulfonic acid, vinyl sulfonic acid, and 2-(meth)acrylamido-2-methyl propanesulfonic acid, and salts thereof; styrene monomers such as styrene and vinyl toluenes; multiethylenically unsaturated monomers such as allyl methacrylate; vinyl esters such as vinyl acetate; and multifunctional monomers such as ureido methacrylate and acetoacetoxyethyl methacrylate.

When a styrene monomer is included in either or both stages of the polymerization, it is preferred that the acrylate monomer is methyl methacrylate, ethyl acrylate, butyl acrylate, 2-ethylhexyl acrylate, or combinations thereof; the combinations of styrene and butyl acrylate; styrene and ethylhexyl acrylate; or styrene, butyl acrylate, and methyl methacrylate are particularly preferred when styrene is used as an additional monomer.

The amount of the first acrylic monomer is from 5 to 50 weight percent, preferably from 20 to 40 weight percent of the first and second acrylic monomers. The type and relative amounts of monomers in each stage are selected so that the $T_g$ of the final latex polymer is in the range of from −20° C. to 50° C., preferably, −10° C. to 20° C., and most preferably −5° C. to 15° C.

The final latex polymer is advantageously contacted with pigment particles under shear to form a latex pigment composite. The preferred pigment particles have a refractive index of at least 1.8. Examples of suitable pigments include zinc oxide, antimony oxide, zirconium oxide, chromium oxide, iron oxide, lead oxide, zinc sulfide, lithopone, and anatase and rutile titanium dioxide. Preferably, the pigment particles are rutile $TiO_2$ particles and, particularly, rutile $TiO_2$ particles surface treated with oxides of aluminum and/or silicon.

The latex pigment composite, preferably the latex $TiO_2$ composite, is advantageously formulated into an aqueous coating composition along with one or more binders and thickeners and any of a number of ancillary materials including fillers; other pigments, including encapsulated or partially encapsulated pigments and opaque pigments; dispersants; surfactants; defoamers; preservatives; flow agents; leveling agents; and neutralizing agents.

Marked improvements in freeze-thaw properties are observed for the final paint formulation when the phosphorus acid monomer used to make the latex polymer is partitioned between the first and second stages of polymerization. Partitioning is such that the amount of phosphorus acid monomer used in the second stage is from 15 to 40%, and preferably from 17 to 35% by weight of the amount of the phosphorus acid monomer used in the first stage. Significantly, such improvements are achievable without the use of additional volatile or non-volatile coalescing or anti-freeze agents.

The discovery of the advantages of adding a critical amount of adsorbing monomer in the second stage of polymerization is particularly surprising in view of U.S. Pat. No. 7,179,531, which explicitly teaches to prepare a multistage latex polymer that is substantially free, and preferably totally free, of adsorbing groups such as phosphorus acid groups in the second stage of polymerization. (See column 9, lines 25-56; and column 14, lines 63-64). Indeed, as can be seen from the following examples and comparative examples, adding no adsorbing monomer, or too little, in the second stage exacerbates freeze-thaw instability.

EXAMPLES

The following examples are for illustrative purposes only and are not intended to limit the scope of the invention.

Comparative Example 1

Synthesis of PEM/SSS Latex Polymer, No PEM in $2^{nd}$ Stage

A first monomer emulsion was prepared by mixing deionized (DI) water (200 g), Disponil FES 993 Surfactant (Surfactant, 28.25 g, 30% active), butyl acrylate (BA, 285.6 g), methyl methacrylate (MMA, 197.22 g), phosphoethyl methacrylate (PEM, 20.4 g, 65% active), and sodium 4-vinylbenzenesulfonate (SSS, 7.53 g, 90% active). A second monomer emulsion was prepared by mixing DI water (420 g), Surfactant (28.75 g, 30% active), BA (666.4 g), MMA (515.15 g), and ureido methacrylate (UMA, 17 g, 50% active).

To a 5-liter, four-necked round bottom flask equipped with a paddle stirrer, a thermometer, nitrogen inlet, and a reflux condenser was added DI water (900 g) and Surfactant (11.3 g, 30% active). The contents of the flask were heated to 84° C. under a nitrogen atmosphere with stirring. A portion of the first monomer emulsion (110 g) was then added, quickly followed by a solution of sodium persulfate (3.35 g) dissolved in DI water (20 g), and a rinse of DI water (5 g). After stirring for 10 min, the remainder of the first monomer emulsion, with a rinse (25 g), and an initiator solution of sodium persulfate (0.40 g) dissolved in DI water (30 g) were added linearly and separately over 30 min, and stirring was continued at 84° C. for 20 min. Then, a solution of $NH_4OH$ (10 g, 29% active) and DI water (10 g) was added to the flask linearly over a period of 10 min.

The second monomer emulsion and an initiator solution containing sodium persulfate (1.1 g) dissolved in DI water (80 g) were added linearly and separately to the vessel over a period of 80 min. The contents of the flask were maintained at 83-84° C. during the addition of the second monomer emulsion. When all additions were complete, the vessel containing the second monomer emulsion was rinsed with DI water (25 g), which was then added to the flask.

The contents of the vessel were cooled to 65° C. and a catalyst/activator pair was added to the flask to reduce residual monomer. TAMOL™ 2002 Emulsion Dispersant (Dispersant, A Trademark of The Dow Chemical Company or its Affiliates, 37 g, 42% solids) was added. The polymer was then neutralized to pH 8.5 with a dilute KOH solution. The measured particle size was 98 nm and the solids were 46.1%.

Comparative Example 2

Synthesis of PEM/SSS Latex Polymer, PEM in $2^{nd}$ Stage

A first monomer emulsion was prepared by mixing deionized (DI) water (200 g), Surfactant (28.25 g, 30% active), BA (285.6 g), MMA (197.22 g), PEM (20.4 g, 65% active), and SSS (7.53 g, 90% active). A second monomer emulsion was prepared by mixing DI water (420 g), Surfactant (28.75 g, 30% active), BA (666.4 g), MMA (511.75 g), PEM (3.2 g, 65% active), and UMA (17 g, 50% active).

To a 5-liter, four-necked round bottom flask equipped with a paddle stirrer, a thermometer, nitrogen inlet, and a reflux condenser was added DI water (900 g) and Surfactant (11.3 g, 30% active). The contents of the flask were heated to 84° C. under a nitrogen atmosphere with stirring. A portion of the first monomer emulsion (110 g) was then added, quickly followed by a solution of sodium persulfate (3.35 g) dissolved in DI water (20 g), and a rinse of DI water (5 g). After stirring for 10 min, the remainder of the first monomer emulsion, with a rinse (25 g), and an initiator solution of sodium persulfate (0.40 g) dissolved in DI water (30 g), were added linearly and separately over 30 min, and stirring was continued at 84° C. for 20 min. Then, a solution of $NH_4OH$ (10 g, 29% active) and DI water (10 g) was added to the flask linearly over a period of 10 min.

The second monomer emulsion and an initiator solution containing sodium persulfate (1.1 g) dissolved in DI water (80 g) were added linearly and separately to the vessel over a period of 80 min. The contents of the flask were maintained at 83-84° C. during the addition of the second monomer emulsion. When all additions were complete, the vessel containing the second monomer emulsion was rinsed with DI water (25 g), which was then added to the flask.

The contents of the vessel were cooled to 65° C. and a catalyst/activator pair was added to the flask to reduce residual monomer. Dispersant (37 g, 42% solids) was added. The polymer was then neutralized to pH 8.5 with a dilute KOH solution. The measured particle size was 98 nm and the solids were 46.3%.

Table 1 shows the aqueous coating composition formulations for the examples and comparable examples. The non-absorbing emulsion is a BA (47.6%)/MMA (49.1%)/MAA (1.8%)/UMA (1.5%) acrylic latex.

TABLE 1

| Formulations of Aqueous Coating Compositions | | | | | |
|---|---|---|---|---|---|
| Ingredients (in lbs) Premix | | | | | |
| Non Adsorbing Emulsion @ 49.7% Solids | 222.62 | 222.62 | 222.62 | 222.62 | 222.62 |
| Permanent Coalescent | 2.40 | 2.40 | 2.40 | 2.40 | 2.40 |
| Premix Sub-total | 225.02 | 225.02 | 225.02 | 225.02 | 225.02 |
| Premix | | | | | |
| Comp Example #1 @ 46.2% Solids | 237.38 | | | | |
| Comp Example #2 @ 46.2% Solids | | 233.72 | | | |
| Comp Example #3 @ 46.2% Solids | | | 233.72 | | |
| Example #1 @ 46.0% Solids | | | | 238.69 | |
| Example #2 @ 45.9% Solids | | | | | 239.11 |
| Foamstar A-34 Defoamer | 0.50 | 0.50 | 0.50 | 0.50 | 0.50 |
| Water | 59.09 | 62.79 | 62.79 | 57.77 | 57.36 |
| TiO2 Slurry | 250.99 | 250.99 | 250.99 | 250.99 | 250.99 |
| Premix Sub-total | 547.95 | 548.00 | 548.00 | 547.95 | 547.96 |
| Grind | | | | | |
| TAMOL ™ 2002 Dispersant | 2.32 | 2.32 | 2.32 | 2.32 | 2.32 |
| Grind Surfactant | 2.49 | 2.49 | 2.49 | 2.49 | 2.49 |
| Grind Defoamer | 1.00 | 1.00 | 1.00 | 1.00 | 1.00 |
| Water | 25.71 | 25.71 | 25.71 | 25.71 | 25.71 |
| Then add while increasing speed for a good vortex: | | | | | |
| Extender | 25.00 | 25.00 | 25.00 | 25.00 | 25.00 |
| Disperse for for 20 min | | | | | |
| ACRYSOL ™ RM-5000 Rheology Modifier | 5.57 | 5.57 | 5.57 | 5.57 | 5.57 |
| Grind Sub-total | 62.09 | 62.09 | 62.09 | 62.09 | 62.09 |
| LetDown | | | | | |
| Potassium Hydroxide (5%) | 1.00 | 1.00 | 1.00 | 1.00 | 1.00 |
| ROPAQUE ™ Ultra Opaque Polymer | 65.00 | 65.00 | 65.00 | 65.00 | 65.00 |
| Defoamer | 1.00 | 1.00 | 1.00 | 1.00 | 1.00 |
| ACRYSOL ™ RM-5000 Rheology Modifier | 18.00 | 18.00 | 18.00 | 15.00 | 17.15 |
| ACRYSOL ™ RM-895 Rheology Modifier | 4.00 | 4.00 | 4.85 | 6.14 | 5.85 |
| Water | 96.65 | 96.72 | 95.87 | 97.53 | 95.66 |
| Totals | 1020.72 | 1020.84 | 1020.84 | 1020.74 | 1020.74 |
| Total Volume | 100.00 | 100.00 | 100.01 | 100.00 | 100.00 |
| Total Weight | 1020.72 | 1020.84 | 1020.84 | 1020.74 | 1020.74 |
| Total PVC | 31.87% | 31.87% | 31.87% | 31.87% | 31.87% |
| Volume Solids | 34.70% | 34.70% | 34.69% | 34.70% | 34.70% |
| Weight Solids | 45.08% | 45.08% | 45.08% | 45.08% | 45.08% |

Scrub Resistance Test: (Based on ASTM D 2486-06)

An abrasion testing device, consisting of a brush clamped into a bracket, was moved back and forth over the dried, applied paint film by means of a set of cables on either side. The abrasion tester was leveled before use and operated at 37±1 cycles/min. A 6½"×17½" aluminum plate with two 10-mil (~250 μm)×½"×6½" metal shims was used. The bristles of the brush were leveled before use to permit uniform wear on the paint surface. Leveling was accomplished by running the brush over 100 or 120 mesh aluminum oxide close grain sandpaper.

The aqueous coating composition was drawn down on a black vinyl chart (Type P-121-10N, The Leneta Company) using 178 μm (7 mil) opening of a 7/10 Dow film caster, starting from the secured end of the panel. The time for application was 3 to 4 s from end to end. Three drawdowns were made for each sample. They were air-dried in a horizontal position for 7 days in an open room kept at ambient conditions. Each chart was cut in half lengthwise for a total of six strips. A minimum of three strips was tested, one from each chart. The drawdown was secured to the abrasion tester by using a gasketed frame and brass weights or clamps. The brush was mounted in the holder. Abrasive scrub medium (10 g, Type SC-2, The Leneta Company) was spread evenly on the brush bristles. The brush was placed at the center of the path bristle side up when applying the scrub medium and water, then carefully turned bristle-side down. The test was started. After each 400 cycles before failure, the brush was removed; stirred scrub medium (10 g) added, and the brush replaced. Water (5 mL) was placed on the brush before continuing. The total number of cycles to remove the paint fully in one continuous line ("cut-through") was recorded for each shim. The scrub removal cycles were reported by calculating the total average cut-through from all strips. A minimum of six measurements was used.

Freeze/Thaw Test Method

Samples were prepared by filling half-pint metal containers 75% full with the test aqueous coating composition. The KU viscosity was measured. The containers were sealed and placed into a 0° F. (~−18° C.) freezer for 16 h. The containers were removed and allowed to thaw at ambient conditions for 8 h. The aqueous coatings were hand-sheared and the appearance rated on a scale of 1-5, with a 5 indicating that the coating was smooth and creamy, a 3 indicating that the coating is usable but no longer smooth and creamy, and a 1 indicating that the coating has solidified. The KU viscosity of the coating was measured and a delta KU relative to the initial measurement was recorded. The freeze/thaw was repeated for three cycles.

Examples 1 and 2 and Comparative Example 3 were carried out substantially as described for Comparative Example 2 except for differences in PEM amounts in the $2^{nd}$ stage as noted in Table 1. Table 1 illustrates the effect of KU and Scrub on the distribution of PEM monomer. In each example, 20.4 g of PEM monomer (65% active was used). The reported amount of PEM in Stage 2 is uncorrected for active monomer. PEM ratio refers to the percent by weight of PEM in the second stage of the total weight of monomer in the second stage, divided by the percent by weight of PEM in the first stage of the total weight of monomer in the first stage. $KU_o$ is the initial Stormer viscosity in Krebs units, and Cycles 1-5 refer to freeze-thaw cycles. Scrubs indicates the number of scrubs before failure.

TABLE 1

Effect of PEM Addition in $2^{nd}$ Stage on Freeze-Thaw and Scrub

| $2^{nd}$ Stage PEM Addition | PEM Ratio | $KU_o$ | Cycle 1 KU | Cycle 2 KU | Cycle 3 KU | Cycle 4 KU | Cycle 5 KU | Scrubs |
|---|---|---|---|---|---|---|---|---|
| Comp. Ex 1 - 0 g | 0% | 108 | 122 | >140 | | | | 1129 |
| Comp. Ex 2 - 3.2 g | 7.25% | 108 | >140 | | | | | 1024 |
| Comp. Ex 3 - 5.5 g | 12.5% | 102 | >140 | | | | | 916 |
| Ex. 1 - 8.45 g | 17.5% | 107 | 117 | 128 | 133 | 136 | 135 | 952 |
| Ex. 2 - 16.9 g | 35.0% | 110 | 119 | 122 | 124 | 126 | 126 | 754 |

As the data in Table 1 show, low levels of PEM in the second stage (0%, 7.5%, and 12.5%) ultimately give latex paint formulations that fail the freeze-thaw test; however, notwithstanding prior art teachings to avoid adding phosphorus acid monomer in the second stage, the data clearly show a dramatic advantage in freeze-thaw and acceptable scrub when adding a phosphorus acid monomer above a critical level.

The invention claimed is:

1. A process comprising the steps of:
   a) contacting under emulsion polymerization conditions a first portion of an acrylic monomer with a first portion of a phosphorus acid monomer to form a first stage polymer; and
   b) contacting the first stage polymer with a second portion of an acrylic monomer and a second portion of a phosphorus acid monomer under emulsion polymerization conditions to form a latex polymer;

wherein the amount of the first portion of the phosphorus acid monomer is from 2 to 8 weight percent of the weight of the first stage polymer; the weight of the second portion of the phosphorus acid monomer is from 15 to 40 weight percent of the weight of the first portion of acid monomer; the first portion of the acrylic monomer is from 5 to 50 weight percent of the first and second portions of acrylic monomer; with the proviso that the monomers are selected so that the $T_g$ of the latex polymer is in the range of −20 to 50° C.

2. The process of claim 1 wherein the first and second portions of the phosphorus acid monomers are each phosphoethyl methacrylate.

3. The process of claim 2 wherein the first and second portions of acrylic monomers each comprise methyl methacrylate and one or more monomers selected from the group consisting of ethyl acrylate, butyl acrylate, and 2-ethylhexyl acrylate, wherein the $T_g$ of the latex polymer is in the range of −5° C. to 15° C.

4. The process of claim 3 wherein the first and second portions of acrylic monomers each comprise methyl methacrylate and a) butyl acrylate; b) ethylhexyl acrylate; or c) butyl acrylate and ethyl acrylate; wherein the amount of the first phosphorus acid monomer is from 2 to 4 weight percent of the weight of the first stage polymer; and the first acrylic monomer is from 20 to 40 weight percent of the first and second acrylic monomers.

5. The process of claim 1 wherein, in either or both of steps a) and b), styrene is contacted with the acrylic and phosphorus acid monomers under polymerization conditions; and wherein the acrylic monomer is one or more monomers selected from the group consisting of methyl methacrylate, ethyl acrylate, butyl acrylate, and 2-ethylhexyl acrylate; wherein the $T_g$ of the latex polymer is in the range of −5° C. to 15° C.

6. The process of claim 5 wherein the acrylic monomer is a) butyl acrylate;
   b) ethylhexyl acrylate; or c) butyl acrylate and methyl methacrylate.

7. The process of claim 1 which further includes the step of contacting the latex with inorganic pigment particles under shear to form a latex pigment composite.

8. A coating formulation comprising the latex pigment composite of claim 7, a binder, and a thickener.

* * * * *